United States Patent [19]

Tward

[11] 4,448,071

[45] May 15, 1984

[54] METHOD OF MEASURING AND INDICATING FLUID LEVELS

[75] Inventor: Emanuel Tward, Northridge, Calif.

[73] Assignee: Tward 2001 Limited, Los Angeles, Calif.

[21] Appl. No.: 345,350

[22] Filed: Feb. 3, 1982

[51] Int. Cl.³ .............................................. G01F 23/26
[52] U.S. Cl. ..................................................... 73/304 C
[58] Field of Search .............. 73/304 C; 361/284, 285, 361/301, 303; 340/563, 618, 631, 620

[56] References Cited

U.S. PATENT DOCUMENTS

| 2,357,023 | 8/1944 | Reid et al. | 73/304 C |
| 2,581,085 | 1/1952 | Edelman | 73/304 C |
| 2,700,901 | 2/1955 | Rickner | 361/284 |
| 3,193,760 | 7/1965 | Smith | 73/304 C |
| 3,376,746 | 4/1968 | Roberts | 73/304 C |
| 4,083,248 | 4/1978 | Maier | 73/304 C |
| 4,176,553 | 12/1979 | Wood | 361/284 |

Primary Examiner—Charles Frankfort
Assistant Examiner—David R. Schuster
Attorney, Agent, or Firm—Junkins, Philip D.

[57] ABSTRACT

A method for measuring the level or volume of a fluid within a fluid storage vessel which comprises: providing a multi-capacitor fluid level sensor formed of a pair of capacitors of fixed and substantially like capacitive value and two capacitors having like open dielectric spaces for receiving varying levels of the fluid within the vessel and with the fluid in the spaces consisting of a pair of capacitors of variable capacitive value; connecting the four capacitors of the sensor together to form the four capacitive sides of a wheatstone bridge circuit; applying a source of alternating current of constant voltage and set frequency across the bridge circuit to a first set of bridge terminals at opposite corners of the bridge, each of such terminals located between a fixed capacitor and a variable capacitor of the sensor; interrogating the bridge circuit through a detection circuit connected across the bridge to a second set of bridge terminals independent of said first set of terminals and at opposite corners of the bridge, each of such terminals located between a fixed capacitor and a variable capacitor of the sensor; and measuring the current value in the detection circuit and indicating the value as a fluid level or fluid volume in direct linear relationship with the current value. The method may be used for volume measurement with respect to a wide variety of multi-component systems as long as the dielectric constants for the two or more components are different.

3 Claims, 5 Drawing Figures

METHOD OF MEASURING AND INDICATING FLUID LEVELS

BACKGROUND OF THE INVENTION

1. Field of the Invention

The present invention is related to a novel method for measuring and indicating the level and/or quantity of a fluid in containers or storage tanks and is particularly applicable to situations where it is important to accurately measure and report or record the level or amount of fuel in vehicular fuel tanks including the fuel tanks used in aircraft, watercraft and landcraft. In a more directive sense, the invention relates to a method and system for fluid level or fluid quantity measurement and indication or recordation involving the use of a capacitive type immersion sensor or probe.

2. Description of the Prior Art

Many techniques have been developed to measure the liquid levels and liquid quantities in storage tanks. The most common system for measuring the fuel level in the fuel tank of a motor vehicle employs a variable resistor within the tank. The wiper arm of the variable resistor is connected through a pivot to a float which monitors the upper level of the fuel in the tank. When the vehicle is traveling on a grade, the fuel surface lever is shifted at an angle to its normal horizontal reference plane within the fuel tank and causes the float to monitor an erroneous level, either higher or lower than the correct level, a phenomenon termed "fuel level shift." Additionally, when the vehicle starts, accelerates, slows or stops its motion, waves are generated in the stored fuel. This phenomenon is commonly referred to as "sloshing" and causes the float to bounce up and down, thereby affecting the fuel measurement readings. Mechanical and electrical damping techniques have been employed to reduce the effects of fuel level shift and sloshing, but they have not been shown to be suitable for obtaining instantaneous and accurate fuel level measurements. The adverse affects of fuel level shift and sloshing are even more troublesome in the fuel tanks of aircraft and high speed landcraft and watercraft.

To overcome the problems of fuel level shift and sloshing in fuel level measuring and indicating, a number of systems have been proposed which use immersion condenser units or probes in liquid containers or tanks in combination with suitable electrical circuitry and measuring and indicating instrumentation. In U.S. Pat. No. 2,357,023, granted to O. W. Reid et al and entitled "Liquid Level Measuring Apparatus," the inventors disclose the use of a plate type immersion condenser unit located in a liquid container and for which the liquid itself forms the dielectric between the plates. The capacitive value of the immersion condenser is variable and changes with respect to the level of liquid in the container. By constructing the condenser unit of multiple pairs of plates which are placed in different areas of the container the effects of liquid sloshing or surging and liquid level shift are reduced so as to obtain a more accurate capacitance value for the immersion unit. The immersion condenser unit (whether of single pair or multiple pair plate design) is electrically connected into an alternating current bridge circuit having two condensers of fixed and equal capacity each forming an arm of the bridge, the remaining two arms of the bridge being made up of a variable capacity condenser and the immersion condenser. The bridge circuit (of well known Wheatstone configuration) is connected to a source of alternating current of predetermined frequency and detector and measurement indicating circuitry. The bridge circuitry is arranged to be in an unbalanced state so long as any liquid remains in the container in the dielectric space between the plates of the immersion condenser unit.

U.S. Pat. No. Re. 23,493, granted to A. Edelman and entitled "Liquid Level Gauge" also discloses liquid level detection and measurement indicating circuitry incorporating a plate type immersion condenser unit. This unit, termed a "measuring condenser," has a capacitive value which changes with respect to the level of liquid in a container or tank. The circuitry also includes a "comparison condenser" unit of plate type design which is always maintained fully immersed in the liquid to be measured as to its level or volume. The comparison condenser with respect to different liquids (having different dielectric values) is variable in its capacitance value but with respect to the measuring condenser, and its sensing of various levels of like liquid, provides a compensating or comparison capacitive value to the circuitry so that measurement of a liquid level is independent of the dielectric constant of the liquid and any variation thereof. Both the measuring condenser unit and the comparison condenser unit are exposed to substantially the same ambient conditions as the liquid being measured.

In U.S. Pat. No. 4,194,395, granted to T. J. Wood and entitled "Capacitive Liquid Level Sensor," a capacitive type sensor for measuring liquid levels is proposed in which a plurality of like plate type capacitors are aligned in parallel. The dielectric spaces of each capacitor (isolated from each other) receive the liquid to be measured which (with air, if any, above the liquid) establishes the dielectric for the spaces and thus the capacitance value of each capacitor. Since the capacitors are identically configured they exhibit equal values of capacitance only when the liquid dielectric (and air, if any) between the plates of each capacitor covers equal areas. When the liquid within a container is being measured as to its height level or volume and is sloshing or has its level disoriented with resect to its normal liquid level reference plane, the liquid (functioning as a dielectric) covers different areas of the capacitors and they exhibit dissimilar values of capacitance. Associated circuity interrogates the capacitors and at points when the capacitance values approach equality the system reads one of the values and registers the liquid level or quantity of liquid remaining in the container.

SUMMARY OF THE INVENTION

Prior art capacitive liquid level sensing and associated interrogating, balancing, interpreting and measurement indicating methods are complex and deficient in their approaches to solving the problems of liquid sloshing and liquid level shift and the effects on liquid level and volume measurement of changes in the physical and chemical characteristics of the liquid being measured and of the multiple characteristics of the enviornment of the liquid and its container. The present invention addresses the complexities of the prior art and provides a method and system for fluid level or volume measurement with a high degree of accuracy through the unique operation of a capacitive sensor or probe of multi-capacitor design and simplified associated circuitry which is substantially insensitive to environmental changes and stray capacitances.

It is an object of the present invention to provide an improved capacitive type sensing method and system, applicable to liquid level or volume measurement in both stationary and vehicular liquid storage containers and tanks.

It is another object of the invention to provide a capacitive type liquid level or volumetric sensing method utilizing a multi-capacitor sensor that accurately detects and measures liquid levels or volumes in liquid storage tanks when the liquid therein is sloshing and/or misoriented with respect to its normal surface plane of reference.

A still further object of the invention is to provide a capacitive type fluid level sensing method that is relatively insensitive in its accuracy of measurement to changes in the environmental characterisitcs of such fluid and its container.

Another object of the present invention is to provide a capacitive type fluid level sensing method utilizing a multi-capacitor sensor in association with a simple alternating current bridge circuit, including detector and direct readout circuitry, which is insensitive to changes in the environmental characteristics of such fluid and its container, to fluid motion and misorientation of the container, or to stray capacitance in the sensor-bridge system.

The present invention is intended as an improvement to conventional fluid level or volume measurement methods and systems and is broadly suitable for use in all types of fluid storage containers and tanks and for use with respect to fluid level or volume measurement of conducting as well as non-conducting fluids. The method and system is also applicable to level and volume measurement of conducting and non-conducting fluids which are comprised, at least in part, of a liquid material.

It is to be noted and understood that, throughout this specification and the appended claims, the term or word "fluid" shall and does mean a unicomponent or multi-component substance or composition which tends to flow or tends to conform to the shape or configuration of its container and which may exhibit electrically non-conducting or electrically conducting characteristics. Thus, the term "fluid" encompasses (without limitation) a wide variety of: liquids, gases, powdered or granulated solids, liquid/liquid mixtures or emulsions, liquid/gas mixtures or dispersions, liquid/solid mixtures, and gas/solid mixtures. In further definition of the term "fluid," it is to be understood that multi-component substances comprising a fluid must exhibit for each component a different and determinable dielectric value. Thus, for multi-component fluids or fluids comprised of different phases of the same substance, measurable differences must be exhibited with respect to the dielectric constants for such components or phases.

For purposes of ease of description of the invention and its application to fluid level and fluid quantity measurement, the sensing method and system comprising the invention will, for the most part, be discussed in terms of its applicability to liquid level or liquid volume measurement.

The sensing method and system of the invention utilizes a uniquely configured capacitive sensor or measurement probe structure which extends from the top or high point of a fluid storage tank, in its usual orientation, to the bottom or low point of such tank in such orientation. The capacitive sensor is comprised for four plate type capacitors extending in clustered parallel alignment throughout the length of the sensor so that each capacitor is in contact with the stored fluid throughout the range of levels to be monitored and all capacitors are exposed to the same fluid, atmospheric and container environment. The four capacitors are constructed from four electrically conductive capacitor elements each comprised of two electrically connected capacitive plates. The capacitor elements are mounted in fixed spaced relationship from one another and positioned by the mounting means so that each plate of each capacitor element defines with a plate of the next adjacent capacitor element a dielectric space therebetween whereby the mounted capacitor elements together form four dielectric spaces. Material of constant dielectric value fills two of the dielectric spaces thereby forming with the respective space defining plates a pair of capacitors of fixed capacitive value. The other two dielectric spaces remain open to receive variable quantities of the fluid to be sensed and the plates defining such spaces with the variable quantities of fluid therein cooperate to form a pair of variable capacitors.

In the preferred structure of the multi-capacitor sensor of the present invention, the two fixed value capacitors are of equal capacitance value and are identically constructed and configured with respect to each other so that they respond in like fashion to the environment of the fluid being measured and its container. The two variable value capacitors are likewise identically constructed and configured with respect to each other so that they too respond in like fashion to the environment of the fluid and its container. Since the two variable value capacitors are identically configured they exhibit equal values of capacitance only when the fluid (having its specific dielectric value) between the plates of each capacitor fills equal spaces and covers equal areas. As a corollary, when the fluid within the container is sloshing or has its level disoriented with respect to its normal plane of repose in the container, the fluid functioning as a dielectric in the two variable capacitors will fill different space volumes and cover different areas of such capacitors and they will exhibit dissimilar values of capacitance.

The unique structure of the capacitive sensor, as described in detail hereinafter, permits the pair of fixed value capacitors (having like capacitive value) and the pair of variable value capacitors to be directly utilized as the four capacitive legs or sides of a classic alternating current Wheatstone bridge circuit having an alternating current generator (constant voltage at set frequency) and associated current detection, measurement and value indicating instrument circuitry. The bridge circuitry, comprised of the two fixed capacitors and two variable capacitors forming the sensor, is arranged to be in an unbalanced state (current flowing through the detection circuit) so long as any liquid remains in the container in the dielectric spaces between the plates of the variable capacitors. With the bridge structured and operating in this fashion the detector circuitry reads the bridge unbalance (value of current flow) linearly as a direct measurement of fluid level or volume of fluid in the container within which the sensor is placed. Because all capacitors of the bridge circuit are part of and comprise the multi-capacitor sensor in the system, the bridge circuit is insensitive to stray capacitance and such bridge circuit capacitor components are all subjected to like environmental conditions.

The two variable capacitors of the sensor unit are directly affected in their capacitance values by the fluid levels therein at close but separate locations and the associated detection circuitry may be designed to interrogate these sensor capacitors to derive an output characteristic value at the instants at which the fluid levels within such capacitors are equal (capacitive values then are equal). At such instances the unbalanced state of bridge (value of current flow) is measured and the value indicating circuitry reports (visual and/or recorded) the exact fluid level or volume value in direct linear relationship to the current value. Thus, the unique sensor or probe of this invention monitors and measures fluid levels and volumes with extraordinary accuracy and communicates such measurements through simple alternating current bridge and associated circuitry, for indicating and/or recording in direct digital readout display or analog display, and/or printed fashion or as an electrical signal for control or other purposes. The system circuitry may be designed to hold the preceeding level or quantity measurement value until the generation of a new level or quantity value reading is made.

DESCRIPTION OF THE PREFERRED EMBODIMENTS

Figure 1:
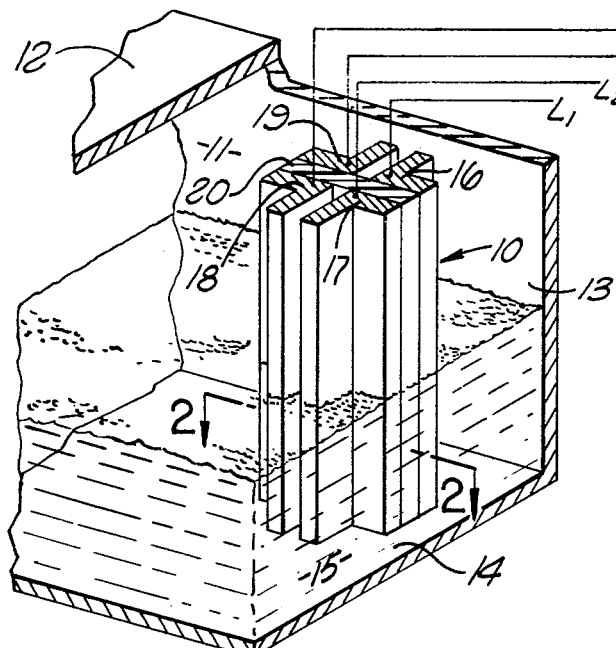
FIG. 1 is a cut-away view of a liquid storage tank in which a multi-capacitor fluid level sensor of the present invention is mounted.

A multi-capacitor liquid level sensor 10, in accordance with the present invention, is illustrated in FIG. 1 in installed position within a liquid storage tank 11 (having a top wall 12, side wall 13 and bottom wall 14) containing a quantity of liquid 15. As shown, the sensor 10 extends from the bottom of the tank to the top and is generally oriented so that the vertical axis of the sensor is normal to the surface plane of the liquid in its static condition. For other and more complex tank configurations the sensor need not be mounted in vertical orientation with respect to the surface plane of static fluid so long as the sensor spans the full range of fluid levels experienced within the tank.

Figure 2:
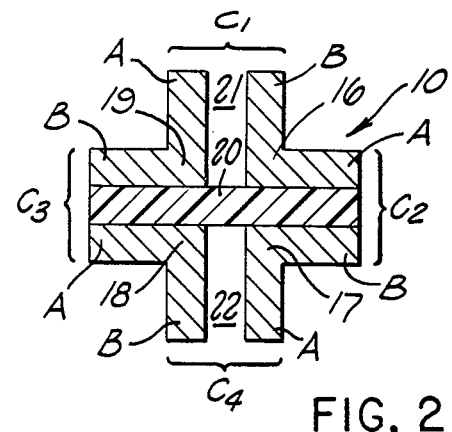
FIG. 2 is a cross-sectional view of the sensor shown in FIG. 1.

The liquid level sensor 10 of FIG. 1 (shown in cross-sectional view in FIG. 2) is comprised of four electrically conductive capacitor elements 16, 17, 18, and 19 each comprised of two capacitive plates "A" and "B". A non-conductive element 20 is provided for mounting the capacitor elements in fixed spaced relationship from one another and for positioning such elements so that each plate thereof defines with a plate of the next adjacent capacitor element a dielectric space therebetween whereby the four mounted capacitor elements together form four dielectric spaces. As shown in FIGS. 1 and 2 the non-conductive mounting element 20 extends between plate A of element 16 and plate B of element 17 and between plate A of element 18 and plate B of element 19 and fills the dielectric spaces between these pairs of plates. Thus, non-conductive mounting element 20, comprised of a sheet or dielectric material, forms with conductive plate A of element 16 and conductive plate B of element 17 and with conductive plate A of element 18 and conductive plate B of element 19 two plate-type capacitors $C_2$ and $C_3$ of like fixed capacitance (impedance) value.

The dielectric spaces 21 and 22, defined (respectively) by plate B of element 16 and plate A of element 19 and plate B of element 18 and plate A of element 17, remain open and free to receive variable quantities and levels of the liquid to be sensed together with vapors above such levels. Thus, the variable liquid-vapor quantities within spaces 21 and 22 form with conductive plate B of element 16 and conductive plate A of element 19 and conductive plate B of element 18 and conductive plate A of element 17 two plate-type capacitors $C_1$ and $C_4$ of variable capacitance (impedance) value.

Figure 3:
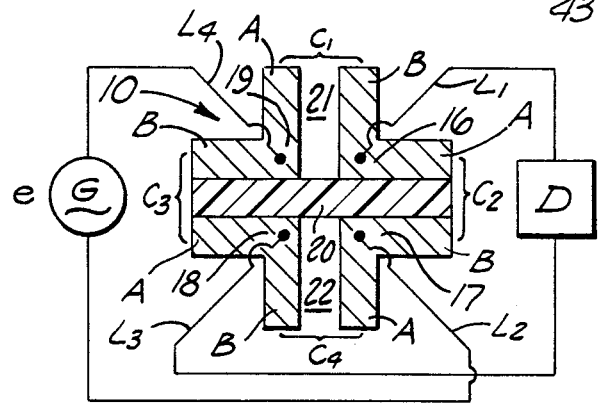
FIG. 3 is an electrical diagram of the bridge circuitry, including the multi-capacitor probe of FIG. 1, employed in the fluid level and volume measuring system of the present invention.

The multi-capacitor sensor 10 is insulated from the tank by any well known means. Electrically conductive lead wires $L_1$, $L_2$, $L_3$ and $L_4$ are connected, respectively, to capacitor elements 16, 17, 18 and 19 and leave the tank 11 via insulated passage therefrom. When these lead wires are further connected to alternating current generator circuitry "e" and detection, measurement and value indicating circuitry "D," as shown in FIG. 3, there results simple bridge circuitry of classic Wheatstone configuration as shown schematically in FIG. 4.

The alternating current generator circuitry e is connected to the bridge circuitry (the capacitors $C_1$, $C_2$, $C_3$ and $C_4$ of the sensor 10) through screened input lead wires $L_2$ and $L_4$. Outlet wires (screened) $L_1$ and $L_3$ connect the bridge circuitry to the detector circuitry D (including appropriate current rectifier circuitry, if required), bridge signal interrogation circuitry, current measurement circuitry and current value indicating circuitry. The bridge signal interrogation circuitry may be designed to respond only to instances when the capacitance values of the variable value capacitors $C_1$ and $C_4$ of the sensor are equal (instances when these capacitors contain equal fluid levels). At such instances the current measurement circuitry determines the output current value of the bridge and the current value indicating circuitry translates such output value into a read-out volumetric or fluid level value or recorded volumetric or fluid level value. Alternatively, the frequency or voltage of the applied alternating current may be varied until the detector circuitry (including its measuring and/or value indicating instrumentation) is set at a predetermined point, the liquid volume being then read off directly or recorded in gallons, liters or other volumetric units by sensing the varied frequency (or its period) or voltage, respectively.

Figure 4:
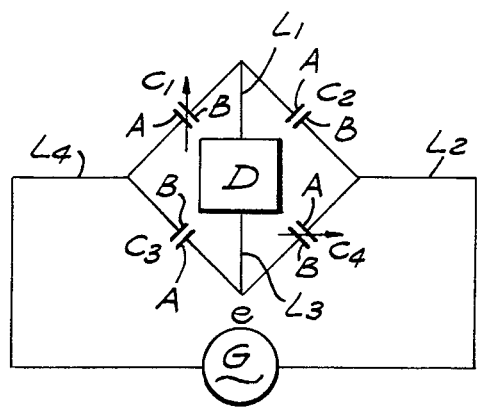
FIG. 4 is a schematic/block diagram of the circuitry of FIG. 3 in which the capacitors of the sensor are more clearly identified in a classic Wheatstone bridge circuit configuration.

For the bridge circuit of FIG. 4 the respective capacitors may have impedance values as indicated below:
  Fixed value capacitors
    $C_2$ impedance = $Z_2$
    $C_3$ impedance = $Z_3$
  Variable value capacitors
    $C_1$ impedance = $Z_1$
    $C_4$ impedance = $Z_4$ The detector circuitry D also presents an impedance value which may be designated as $Z_5$. The alternating current generator circuitry, at set frequency, has a constant voltage "e" which is applied across the bridge. Thus,
  If $Z_2 = Z_3$ and $Z_1 = Z_4$, and If $Z_5$ is of small value, i.e., $Z_5 < Z_1$ and $Z_2$ then it can be established that the current "i" through the detector circuitry is:

$$i = ew/2 \times (C_1 - C_2)$$

where:
e is the voltage value and
$w = 2\pi \times$ frequency

The current value i in the detector circuitry changes in linear relation to changes in the capacitance value of capacitor $C_1$. Therefore, changes in the $C_1-C_2$ relationship may be determined by measuring changes in the current value i. Furthermore, with appropriate detector and a.c. generator circuitry (e.g. by keeping the current i constant and varying the w value) the readout of the $C_1-C_2$ value can be effected by measuring the period of the angular frequency w. Thus, the readout instrumentation in the detector circuitry may yield digital values in direct linear relationship to the actual liquid volume values within the tank or container wherein the sensor of this invention is mounted.

Figure 5:
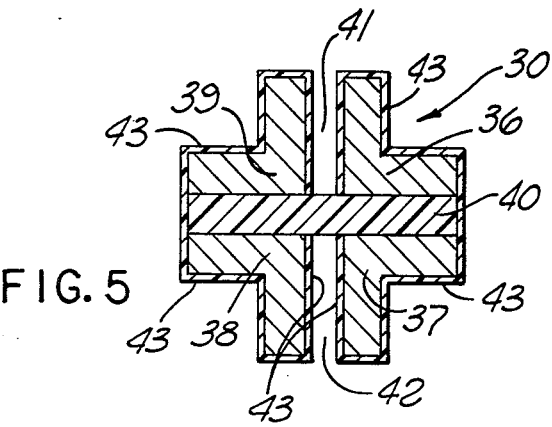
FIG. 5 is a cross-sectional view of an alternative fluid level sensor of the present invention.

It should be understood, that the multi-capacitor fluid level sensing method of the invention is not limited to use with non-conducting fluids. It is equally practical to make fluid level or volume measurements on conducting fluids, provided that the capacitive plates of the electrically conductive capacitor elements of the sensor are coated with an insulating film thereby preventing the passage of shorting components of current between such plates via the conducting fluids. Thus, there is shown in cross-sectional view in FIG. 5 a fluid level sensor 30, of design similar to the sensor 10 of FIGS. 1, 2 and 3, including electrically conductive capacitor elements 36, 37, 38, and 39 mounted in fixed spaced relationship by non-conductive element 40. The four conductive capacitor elements are coated with an insulating film 43 which maintains the capacitance integrity of the pair of fixed value capacitors and pair of variable capacitors comprising the sensor 30.

The unique multi-capacitor sensing method of this invention also is not limited to level or volume measurements of liquids in tanks or storage containers, but may be used (for example) in the level or volumetric measurement of powdered and granular materials in tanks, containers, hoppers and the like. Broadly, the method may be used for volume measurement with respect to a wide variety of multi-component systems (liquid/liquid, liquid/gas, liquid/solid, solid/gas, etc.) as long as the dielectric constants for the two or more components are different. It must be understood that in all level or volumetric measurement uses of the sensor a multi-component system (at least two materials) is involved over the measurement range. Thus, in the case of a simple fuel tank only at two measured instances is a single component sensed, i.e., when the tank is absolutely filled with fuel of known dielectric value with no air present and when the tank is absolutely empty of fuel with only air present with its known dielectric value. All other sensedinstances involve the measurements of the dielectric value of a multi-component system, i.e., the fuel and air. The only requirement for applicability of the sensor for depth or volumetric measurement of a multi-component system is that the two dielectric spaces of the variable value capacitors of the sensor be exposed to the system over the entire range of component variety of change for which measurement is desired.

Powdered and granular materials in containers and hoppers, as mentioned above, also present a multi-component system, the depth or volume of which can be measured by the method of this invention. Such materials have a determinable dielectric value in their normal state of gravity packed repose. Thus, as a stored material or hopper fed material, volume or depth measurements can be made with the method for a two-component system comprised of the material and air. Further, the volume of such solid materials in a fluidized state (solid/gas mixture) can be ascertained by the method.

In a more complex application of the method the volume of liquids in a gas can be measured and reported. Thus, with proper calibration of the "full" and "empty" settings of the detector circuitry of the bridge circuit associated with a sensor (with insulating coating on capacitor plates) mounted in a water storage tank, the volume of water in the tank can be accurately measured even though the water therein is subjected to zero gravity and is suspended as micro-droplets in the air (liquid/gas mixture) within the tank. The method measures the combined dielectric value of the dispersion of water droplets and air.

Numerous other examples of multi-component systems can be suggested for which depth and/or volume measurements can be made and reported via the multi-capacitor sensor of the present invention and the simple Wheatstone bridge circuitry associated therewith. The sensor system is insensitive to stray capacitances because it contains all of the fixed and variable capacitors comprising the bridge circuitry and all of such capacitors are subject to the same multi-component system and container environment. Further, the sensor system may be applied to material level, depth and volume measurement situations in which the material container is subjected to misorientation and the material within the container is subjected to sloshing or other unnatural environmental conditions such as low or high temperatures or zero gravity.

While the invention has been described in detail with respect to a number of preferred embodiments, it will be understood by those skilled in the art that various changes and modifications may be made without departing from the spirit and scope of the novel concept of this invention. Therefore, it is intended by the appended claims to cover all such modifications and variations which fall within the true spirit and scope of the invention.

What is claimed is:

1. A method for measuring the level of a fluid within a fluid storage vessel over a predetermined height range comprising:
    (a) sensing the fluid level within said vessel with a multi-capacitor fluid level sensor having a length at least equal to said height range and formed of a first pair of capacitors of said length and of fixed and substantially like capacitive values located within said vessel and of a second pair of capacitors of said length and having like open dielectric spaces located within said vessel for receiving varying levels of the fluid within said vessel, said fluid within said spaces functioning as a variable dielectric material therein whereby said second pair of capacitors have variable capacitive values related linearly to the fluid level within said spaces;
    (b) connecting the four capacitors of said sensor together to form the four capacitive sides of a Wheatstone bridge circuit, the pair of fixed value capacitors connected as two opposing sides of said bridge and the pair of variable value capacitors connected as the remaining two opposing sides of said bridge;

(c) applying a source of alternating current of constant voltage and set frequency across said bridge circuit to a first set of bridge terminals at opposite corners of the bridge, each of said first terminals located between a fixed capacitor and a variable capacitor of said sensor;

(d) connecting a current flow detection circuit across said bridge to a second set of bridge terminals independent of said first set of terminals and at opposite corners of the bridge, each of said second terminals located between a fixed capacitor and a variable capacitor of said sensor, said bridge circuit being in an unbalanced capacitive state so long as any fluid remains in the dielectric spaces of the variable value capacitors and said detection circuit experiencing a current flow so long as said bridge is in said unbalanced state with the current value of said current flow related linearly to the variable capacitive values of the variable capacitors; and (e) measuring the current value in said detection circuit and indicating said value as a fluid level value in direct linear relationship with said current value.

2. A method for measuring the level of a fluid within a fluid storage vessel over a predetermined height range comprising:

(a) sensing the fluid level within said vessel with a multi-capacitor fluid level sensor having a length at least equal to said height range and formed of a first pair of capacitors of said length and of fixed and substantially like capacitive values located within said vessel of a second pair of capacitors of said length and having like open dielectric spaces located within said vessel for receiving varying levels of the fluid within said vessel, said fluid within said spaces functioning as a variable dielectric material therein whereby said second pair of capacitors have variable capacitive values related linearly to the fluid level within said spaces;

(b) connecting the four capacitors of said sensor together to form the four capacitive sides of a Wheatstone bridge circuit, the pair of fixed value capacitors connected as two opposing sides of said bridge and the pair of variable value capacitors connected as the remaining two opposing sides of said bridge;

(c) applying a source of alternating current of constant voltage and set frequency across said bridge circuit to a first set of bridge terminals at opposite corners of the bridge, each of said first terminals located between a fixed capacitor and a variable capacitor of said sensor;

(d) connecting a current flow detection circuit across said bridge to a second set of bridge terminals independent of said first set of terminals and at opposite corners of the bridge, each of said second terminals located between a fixed capacitor and a variable capacitor of said sensor, said detection circuit including current value measuring and current value indicating circuitry, said bridge circuit being in an unbalanced capacitive state so long as any fluid remains in the dielectric spaces of the variable value capacitors and said detection circuit experiencing a current flow so long as said bridge is in said unbalanced state with the current value of said current flow related linearly to the variable capacitive values of the variable capacitors;

(e) setting the current value indicating circuitry at zero and maximum value points with respect to zero and maximum levels of fluid within the vessel and within the dielectric spaces of the pair of capacitors of variable capacitive value; and (f) measuring the current value in said detection circuit and indicating said value as a fluid level value in direct linear relationship with said current value.

3. A method for measuring the quantity of a fluid within a fluid storage vessel over a predetermined volume range comprising:

(a) sensing the fluid quantity within said vessel with a multi-capacitor fluid quantity sensor having a length spanning the volume range of said vessel and formed of a first pair of capacitors of fixed and substantially like capacitive values located within said vessel and of a second pair of capacitors having like open dielectric spaces located within said vessel for receiving varying quantities of the fluid within said vessel, said fluid within said spaces functioning as a variable dielectric material therein whereby said second pair of capacitors have variable capacitive values related linearly to the fluid quantity within said spaces;

(b) connecting the four capacitors of said sensor together to form the four capacitive sides of a Wheatstone bridge circuit, the pair of fixed value capacitors connected as two opposing sides of said bridge and the pair of variable value capacitors connected as the remaining two opposing sides of said bridge;

(c) applying a source of alternating current of constant voltage and set frequency across said bridge circuit to a first set of bridge terminals at opposite corners of the bridge, each of said first terminals located between a fixed capacitor and a variable capactitor of said sensor;

(d) connecting a current flow detection circuit across said bridge to a second set of bridge terminals independent of said first set of terminals and at opposite corners of the bridge, each of said second terminals located between a fixed capacitor and a variable capacitor of said sensor, said bridge circuit being in an unbalanced capacitive state so long as any fluid remains in the dielectric spaces of the variable value capacitors and said detection circuit experiencing a current flow so long as said bridge is in said unbalanced state with the current value of said current flow related linearly to the variable capacitive values of the variable capacitors; and (e) measuring the current value in said detection circuit and indicating said value as a quantity value of fluid in direct linear relationship with said current value.

* * * * *